United States Patent [19]

Lipari

[11] 4,410,383
[45] Oct. 18, 1983

[54] METHOD FOR THE MANUFACTURE OF THERMOPLASTIC TUBULAR MEMBERS

[75] Inventor: Charles P. Lipari, Setauket, N.Y.

[73] Assignee: Rai Research Corporation, Hauppauge, N.Y.

[21] Appl. No.: 296,804

[22] Filed: Aug. 27, 1981

[51] Int. Cl.³ ............... B29C 27/08; B32B 31/18
[52] U.S. Cl. .................... 156/73.1; 156/73.3; 156/80; 156/251; 156/290; 156/308.4; 429/139; 429/141; 429/145; 429/249
[58] Field of Search ............... 156/73.1, 73.3, 580.1, 156/580.2, 498, 251, 80, 290, 308.4; 264/23; 429/141, 139, 145, 249, 251

[56] References Cited
U.S. PATENT DOCUMENTS

| | | | |
|---|---|---|---|
| 3,378,429 | 4/1968 | Obeda | 156/515 |
| 3,562,041 | 2/1971 | Robertson | 156/73 |
| 3,733,238 | 5/1973 | Long et al. | 156/580 |
| 3,737,361 | 6/1973 | Obeda | 156/580.1 |
| 3,852,144 | 12/1974 | Parry | 156/73.3 |
| 3,939,033 | 2/1976 | Grgach et al. | 156/515 |
| 4,065,344 | 12/1977 | Weist | 156/498 |
| 4,097,327 | 6/1978 | Calemard | 156/580.2 |
| 4,149,288 | 4/1979 | Sendor | 11/1 AD |
| 4,210,998 | 7/1980 | Gaunt | 429/139 |
| 4,220,693 | 9/1980 | Di Palma et al. | 429/133 |
| 4,333,978 | 6/1982 | Kocher | 156/73.1 |

*Primary Examiner*—Michael G. Wityshyn

[57] ABSTRACT

A method for manufacturing tubular shaped thermoplastic members comprising conveying two thin sheets of thermoplastic material in close substantially parallel relationship through an ultrasonic welding station for forming a plurality of continuous spaced apart seams substantially parallel to the direction of conveying for joining the two sheets of thermoplastic material. The seams, thus formed, are cut substantially parallel to the direction of conveying such that the two sheets of thermoplastic material remain joined adjacent each side of the cuts. Preferably, the cutting takes place substantially simultaneously with the ultrasonic formation of the seams and the thin sheets of thermoplastic material are cooled prior to the ultrasonic welding. An apparatus for practicing the method is also disclosed. The method and apparatus are particularly adaptable for the manufacture of ionically permeable thermoplastic separators for use in electrochemical cells and the like.

37 Claims, 8 Drawing Figures

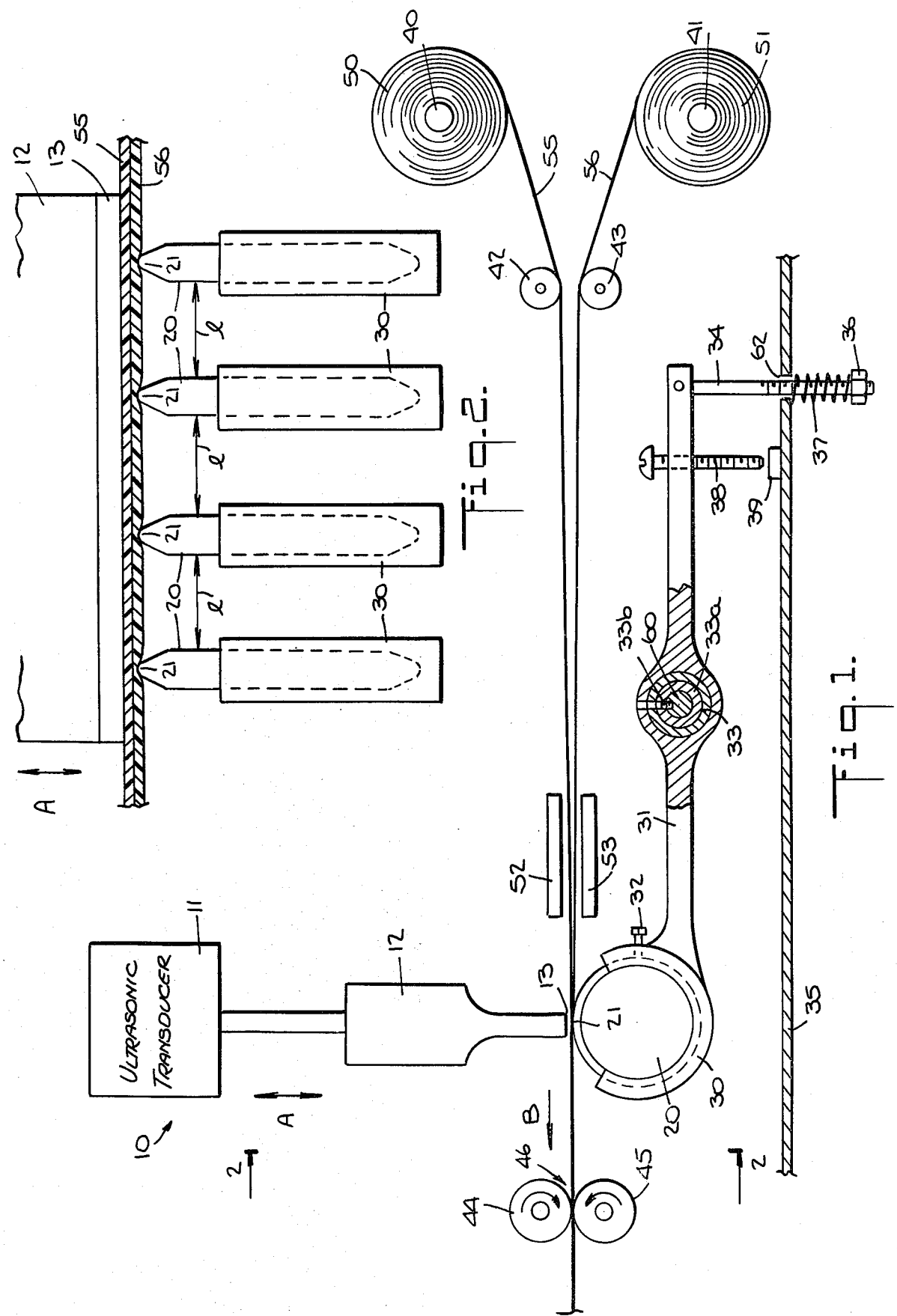

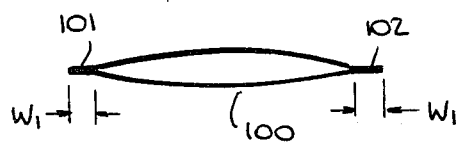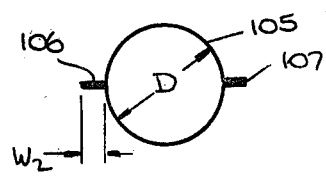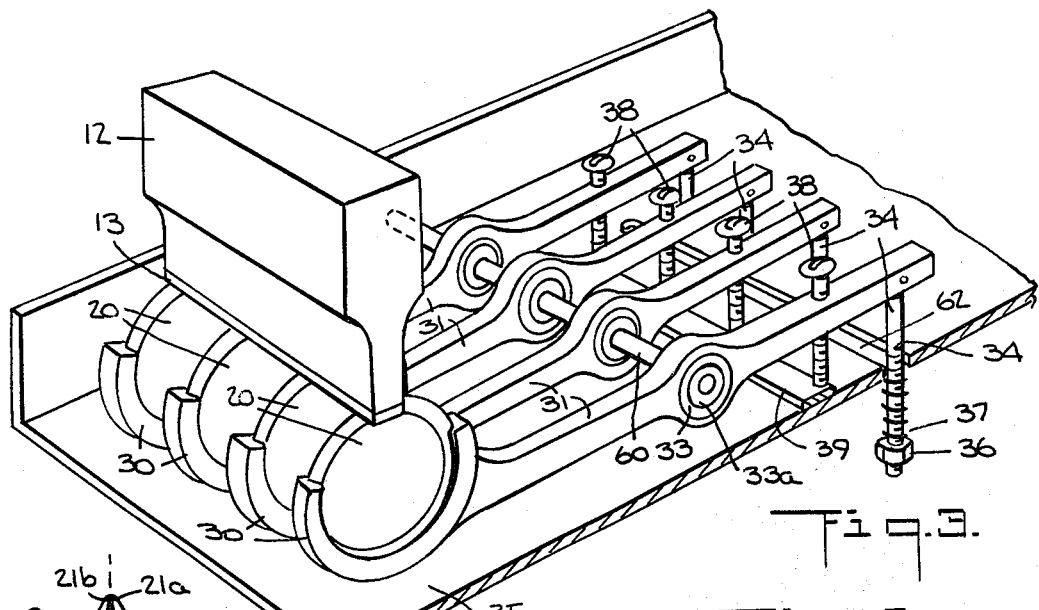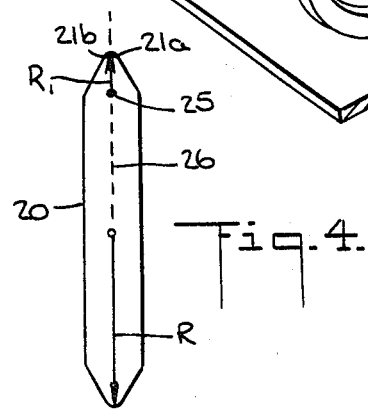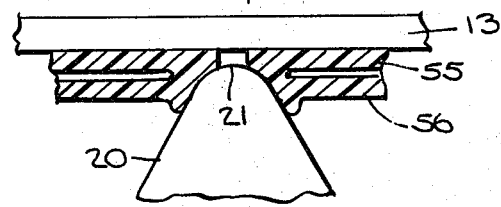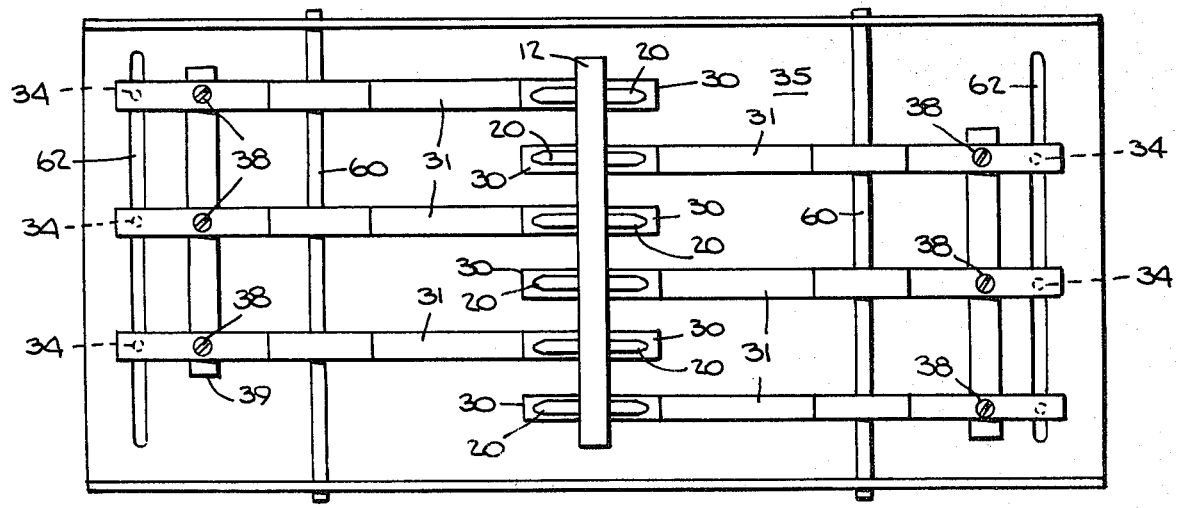

METHOD FOR THE MANUFACTURE OF THERMOPLASTIC TUBULAR MEMBERS

FIELD OF THE INVENTION

This invention relates to a method and apparatus for the manufacture of thin walled thermoplastic tubular-like members. More particularly, this invention relates to a method and apparatus for the manufacture of ionically permeable thermoplastic tubular separators suitable for use in electrochemical cells by means of ultrasonic welding.

BACKGROUND OF THE INVENTION

Separator membranes used in alkaline electrochemical cells for the purpose of physically separating the anode and cathode to prevent dendrite growth between the two electrodes while at the same time permitting ionic flow therethrough are well known in the art. Separator membranes possess characteristics of low electrolytic resistance and high resistance to oxidation and corrosive attach in alkaline solutions at high temperatures. Furthermore, the separator membrane must have sufficient mechanical strength to prevent dendrite growth or treeing between the electrodes and to withstand the rigors of battery fabrication. Thin membranes of thermoplastics such as polyethylene and polypropylene are commonly used as separators since they are very stable in an alkaline electrolyte environment of alkaline electrochemical cells. Other thermoplastic films may be used. As is known in the art, such materials cannot function as separators in their basic thin film form since they are ionically impermeable. Accordingly, they are treated mechanically to provide pores for ionic permeability or they are chemically or radiation grafted so that they can function as separators by allowing hydroxyl ion flow therethrough. Both crosslinked and non-crosslinked thermoplastic separator membranes are known in the art.

Separators frequently have contiguously associated with one side thereof a thin mat or felt of absorbent material for the absorption and retention of electrolyte. Typically, the absorbent is associated with the side of the separator such that the absorbent mat is positioned between the separator and the anode of the electrochemical cell. In some instances, the mat or felt associated with the separator may be positioned between the separator and the cathode; may be associated with both sides of the separator membrane; or a separator membrane may be associated with both sides of a layer of absorbent felt in accordance with the design requirement of a particular electrochemical cell. The absorbent material also possesses the characteristics of resistance to attach by corrosive materials such as hydroxides; resistance to oxidation; low ionic impedance; and resiliency under compression.

In electrochemical cells having cylindrical shaped anodes, the separator membrane or the separator membrane/absorbent material composite will have a tubular shape for receiving the cylindrical anode. Heretofore, tubular shaped separator membranes or separator membrane/absorbent composites have been manufactured by heat sealing, impulse heat sealing, or adhesive joining. A sheet of separator membrane or separator membrane/absorbent mat composite material would be sized and rolled into tubular form. The two ends along the length of the rolled tube would be overlapped or brought together in the form of a tab. The lap or tab would then be heat sealed, impulse heat sealed or glued. The seals thus formed result in a waste of material and a loss of effective ionically permeable area of the tubular separator.

Heat sealing has a particular disadvantage in that the heat required to form the heat seal tends to overheat the area adjacent the heat seal. That is, there is a transition area adjacent the heat seal where the melting process starts to take place. This results in a high electrolytic resistance in the area of the tube adjacent the heat seal and thus results in further reduction of the effective ionically permeable area of the tubular separator.

Impulse heat sealing does not cause as great an area adjacent the seal to be overheated as conventional heat sealing. Nevertheless, an area adjacent the seal is still overheated thus reducing this areas electrolytic resistance resulting in the reduction of the effective ionically permeable area of the tubular separator.

A further disadvantage of heat sealing and impulse heat sealing arises in the manufacture of ionically permeable tubular separators formed from a composite membrane/absorbent material. Where there is a great difference in the thickness of the two materials forming the composite, it is difficult to get a good effective seal.

Gluin or adhesive joining is generally an inefficient and difficult manufacturing process to perform.

OBJECT OF THE INVENTION

Accordingly, it is an object of the present invention to provide an improved method and apparatus for the manufacture of ionically permeable thermoplastic tubular separators suitable for use in electrochemical cells and other applications.

It is a further object of the present invention to provide a method and apparatus for increasing the efficiency of the manufacture of such tubular separators by providing for the automated manufacture of a plurality of tubular separators for use in electrochemical cells from two thin sheets of separator membrane or separator membrane/absorbent felt composite material.

It is yet a further object of the present invention to provide a method and apparatus for the manufacture of ionically permeable thermoplastic tubular separators having an increased effective ionically permeable area.

It is still a further object of the present invention to provide a method and apparatus for the manufacture of ionically permeable thermoplastic tubular separators which results in less material waste.

It is still another object of the present invention to provide a method and apparatus for the manufacture of ionically permeable thermoplastic tubular separators having good quality seals from composite separator membrane/absorbent mat materials wherein there is a great difference in the thickness of the two materials of the composite.

It is yet still another object of the present invention to provide a method and apparatus for the high speed manufacture of thermoplastic tubular members while providing for good quality seams and avoiding damage to the thermoplastic material.

These and other objects will be apparent from the following description and claims in conjunction with the drawings.

SUMMARY OF THE INVENTION

The present invention may be generally summarized as a method for manufacturing thermoplastic tubular members comprising:

bringing together two thin sheets of thermoplastic material in close substantially parallel relationship;

conveying said sheets in a predetermined path;

continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets; and cutting said seams substantially parallel to the direction of said conveying such that said sheets remain joined adjacent each side of said cut.

In a preferred embodiment of the method in accordance with the present invention, the ultrasonic welding and the cutting occur substantially simultaneously.

In a further preferred embodiment of method of the present invenion, the thin sheet-like thermoplastic material is cooled prior to the ultrasonic welding.

Another embodiment of the present invention may be generally summarized as an apparatus for manufacturing thermoplastic tubular members comprising:

means for bringing together two thin sheets of thermoplastic material in close substantially parallel relationship;

means for conveying said sheets in a predetermined path;

means for continuously ultrasonically welding said thermoplastic sheets at least at two locations spaced apart in a direction substantially perpendicular to the direction of conveyance at a selected position along said path thereby forming at least two continuous spaced apart seams substantially parallel to the direction of conveyance joining said sheets; and means for cutting said seams substantially parallel to said direction of conveyance such that said sheets remain joined adjacent each side of said cut.

In a preferred embodiment of the apparatus in accordance with the present invention, the cutting means cuts the seams substantially simultaneously with their formation by the ultrasonic welding means.

In a further preferred embodiment of the apparatus in accordance with the present invention, means are provided to cool the thin sheet-like thermoplastic material prior to the ultrasonic welding.

The method and apparatus in accordance with the present invention may be used for the manufacture of tubular separators for use in alkaline and acid battery systems from sheets of ionically permeable thermoplastic membranes and from composite sheets of ionically permeable thermoplastic membranes having contiguously associated on at least one side thereof a thermoplastic felt absorbent. The tubular separators manufactured in accordance with the method and apparatus of the present invention may also be useful in other applications such as dialysis for acid-metal separation, Donnan dialysis for acid-metal separation and gas drying separators. The invention will have general application in the joining of thin sheets of thermoplastic material.

BRIEF DESCRIPTION OF THE DRAWINGS

In the drawing, forming part hereof, in which like reference characters indicate corresponding parts in all the views:

FIG. 1 is a schematic side elevation view of the apparatus for manufacturing tubular separators in accordance with the present invention;

FIG. 2 is a schematic elevation view taken on the line 2—2 of FIG. 1 with parts omitted;

FIG. 3 is a schematic perspective view with parts omitted of the apparatus for manufacturing tubular separators of FIG. 1;

FIG. 4 is an enlarged sectional elevation view of an anvil member 20 as viewed in FIG. 2;

FIG. 5 is an enlarged schematic cross-sectional elevation view of a tubular separator, partially flattened, manufactured by the apparatus and method in accordance with the present invention;

FIG. 6 is an enlarged schematic cross-sectional elevation of a tubular separator manufactured by the apparatus and method in accordance with the present invention;

FIG. 7 is a schematic plan view of an advantageous anvil arrangement for the apparatus for manufacturing tubular separators in accordance with the present invention; and FIG. 8 is an exaggerated schematic elevation view illustrating the substantially simultaneous ultrasonic welding and cutting in accordance with the present invention.

DESCRIPTION OF THE PREFERRED EMBODIMENT

In order to afford a complete understanding of the present invention and an appreciation of its advantages, a description of the preferred embodiments is set forth below.

FIG. 1 shows an ultrasonic welder 10 comprising an ultrasonic transducer 11 and a horn 12 having a tip 13 which advantageously has a carbide face. Such ultrasonic welders are well known in the art and therefore not illustrated in detail. A suitable ultrasonic welder would be a Model 1200 manufactured by Branson Sonic Power Company, Danbury, Conn. 06810. As seen in FIGS. 2 and 3, tip 13 is elongated with its face surface located in a substantially horizontal plane.

Positioned below the tip 13 are a plurality of anvil members 20 having a general disc-like shape. A portion of the peripheral circumferential surface or rim of each disc shaped anvil member 20 is closely adjacent tip 13 for providing an anvil surface area 21 for ultrasonic welding. The anvil members 20 and accordingly the anvil welding surface areas are spaced apart a selected distance in the direction of the tip 13 elongation. Anvil members 20 are illustrated in FIG. 2 spaced apart a selected distance in the direction of tip 13 elongation.

Each anvil member 20 is mounted by being received and seated by a recess of U-shaped jaw 30 which is a first end of anvil mounting arm 31. Anvil member 20 is fixed in jaw 30 by a set screw 32.

Arm 31 is pivotally mounted on fixed horizontally disposed rod 60 by being pressed on an oil lite bearing 33 which is rotatably mounted on the rim of a bushing 33a. Bushing 33a is fixedly mounted to rod 60 by means of a set screw 33b engaging a slot 61 in the surface of rod 60. Mounting of rod 60 is not illustrated since it may be routinely accomplished by one skilled in the art, for example, by wall members extending vertically upward from plate-like frame member 35.

Threaded stem 34 extends essentially vertically downward from the second end of arm 31 passing through a slotted hole 62 in fixed plate-like frame member 35. Mounting of frame member 35 is not illustrated since it may be routinely accomplished by one skilled in the art. Tension adjust nut 36 is screwed onto threaded stem 34. Helical coil spring 37 surrounds threaded stem 34 with a first end engaging frame member 35 and a second end engaging tension nut 36.

Screw-like positive stop member 38 is threadably engaged to a tapped bore in arm 31 near the second end of arm 31 and extends substantially vertically downwardly toward stop block 39. It will be appreciated that stop member 38 may be adjusted or set to limit the maximum vertical movement of anvil 20.

It will be apparent to one skilled in the art that adjustment of stop member 38 will cause arm 31 to pivot about rod 60. Accordingly, the gap between the anvil 20 peripheral rim surface area 21 adjacent tip 13 of horn 12 may be adjusted by adjusting stop member 38.

Compression of spring 37 between frame 35 and nut 36 anvil 20 to be resiliently mounted. When a workpiece passes between tip 13 of horn 12 and the anvil 20 and the horn is caused to ultrasonically vibrate upwardly and downwardly in the vertical direction (as indicated by the double arrow A of FIG. 1), spring 37 will cause anvil 20 to urge the workpiece toward the tip 13 of the ultrasonic welding horn 12. That is, during ultrasonic welding, spring or resilient means 37 causes anvil 20 to apply pressure or force on the workpiece substantially perpendicular to the tip surface 13. It will be appreciated that the force exerted by spring 37 will be a function of the product of the length of deformation of the spring from its unstressed condition and the spring constant for the particular spring. The use of resiliently mounted anvil members in ultrasonic welding is well known and understood by one skilled in the art.

The apparatus is provided with a first drum 40 mounted for free rotation on a substantially horizontal axis with the axis being substantially parallel to the direction of elongation of tip 13. A second drum 41 is spaced below drum 40 and is mounted for free rotation on a substantially horizontal axis with axis being substantially parallel to the direction of elongation of tip 13.

Drums 40 and 41 are for holding and dispensing rolls 50, 51 of thin sheet-like thermoplastic membrane separator material or thin sheet-like composite membrane separator and absorbent material.

Two freely rotating guide rollers 42 and 43 are rotatably mounted between rollers 40 and 41 and tip 13 on substantially horizontal axes which are substantially parallel to the direction of elongation of tip 13. The axes of rollers 42 and 43 are substantially vertically aligned with roller 42 above roller 43 and with rollers 42 and 43 spaced apart to bring together and press through the thin sheet-like material dispensed from drums 40 and 41.

Two driven rollers 44 and 45 are rotatably mounted on the side of tip 13 of horn 12 of ultrasonic welder 10 opposite to the side drums 40 and 51 are mounted as illustrated in FIG. 1. Rollers 44 and 45 are mounted on substantially horizontal axes which are substantially parallel to the direction of elongation of tip 13. The axes of rollers 44 and 45 are substantially vertically aligned and rollers 44 and 45 are mounted to form a nip 46 between rollers 44 and 46 to convey or drive the thin sheet-like material dispensed from the rolls 50 and 51 on drums 40 and 41 in the direction of the arrow B. Accordingly, roller 44 is rotatably driven in the clockwise direction and roller 45 is rotatably driven in the counter-clockwise direction. Means for driving rollers 44 and 45 are not illustrated since they may be routinely provided by one skilled in the art. The circumferential peripheral surfaces of drive rollers 44 and 45 are suitably rubber or a like material with a high coefficient of friction to facilitate the conveying function of these rollers.

Drums 40 and 41 for dispensing the thin sheet-like membrane material are advantageously provided with braking means, for example, air brakes, to impede the free rotation of the drums and hence maintain tension on the conveyed sheet-like material to be ultrasonically welded.

In a preferred embodiment of the present invention, cooling means, illustrated as cold plates 52 and 53, are positioned between guide rollers 40 and 41 and tip 13 to cool the sheets of thermoplastic to a temperature of less than about 10° C. and suitably about 10° C. to −30° C. prior to ultrasonic welding. The cooling may be provided, for example, by a refrigerant such as dry ice or conventional mechanical refrigeration means. Although not required, the cooling of the sheets of thermoplastic material prior to ultrasonic welding appears to improve the quality of the weld seal and permits an increase in speed at which the thin sheets of thermoplastic material to be ultrasonically welded may be conveyed through the welding station. The cooling of the thin sheets of thermoplastic material has been also found, in some instances, to prevent damage to the material during ultrasonic welding and cutting when the material is conveyed at high speeds. By way of explanation, it is believed that cooling of the thermoplastic material changes its modulus of elasticity to provide the beneficial results. However, this explanation is not intended to limit the scope of the invention. The cooling means is not illustrated in detail since it may be routinely provided by one skilled in the art.

In a preferred embodiment of the present invention, anvil member 20 is a disc-shape plate having a convexly rounded peripheral rim surface 21. As best seen in FIGS. 2 and 4, rounded rim surface 21 is defined by a radius of curvature $R_1$ having a center at 25 located in a plane 26 substantially parallel to a radius R defining the circumferential periphery of the disc. Plane 26 bisects rounded rim surface 21 so that rounded surface 21 is essentially symmetric on either side of plane 26. That is, the length of arc 21a to the right of plane 26 as viewed in FIG. 4 is substantially equal to the length of arc 21b to the left of plane 26. Accordingly, rim surface 21 is substantially symmetrically rounded transverse to the thickness of the disc-shaped plate.

Disc-shaped anvil members 20 are substantially vertically mounted in jaws 30 (i.e., plane 26 is substantially parallel to the vertical) and aligned with respect to tip 13 of ultrasonic welder 10 such that rim surface 21 is rounded substantially transverse the direction of conveyance of the thin sheet-like thermoplastic material indicated by arrow B of FIG. 1. That is, disc-shaped anvil members 20 are aligned parallel to the direction of conveyance of the thin sheet-like thermoplastic material. A portion of the rounded peripheral rim 21 of each disc-shaped anvil member 20 is closely adjacent tip 13 for providing an anvil surface area for ultrasonic welding. Disc-shaped anvil member 20 is advantageously fabricated from a tool steel having a Rockwell hardness of more than 65.

In operation, the present invention functions as follows. A roll of thin sheet-like ionically permeable thermoplastic membrane material is disposed on an upper drum 40 and lower drum 41. As will readily be appreciated, the length of the thermoplastic material on each roll will generally greatly exceed the width. The two sheets 55 and 56 of thermoplastic material are fed in a path between guide rollers 42 and 43 which causes the dispensed sheets 55 and 56 to be brought together in close substantially parallel relationship. The sheets are fed between cold plates 52 and 53 of the refrigeration means and thence between the elongated surface of tip 13 of ultrasonic welder 10 and the closely adjacent anvil welding surface areas 21 of the plurality of spaced apart anvils 20 below tip 13. A piece of dry ice positioned below the brought together sheets 55 and 56 has been found to operate in a satisfactory manner in cooling the thermoplastic sheets. The sheets are then fed into the pin 46 of upper and lower drive rollers 44 and 45. Rotation of drive rollers 44 and 45 causes the sheets of thin thermoplastic battery separator membrane material to be conveyed along the foregoing described predetermined path. The direction of elongation of tip 13 of ultrasonic welder 10 is substantially perpendicular to the direction of conveyance (Arrow B of FIG. 1) of the two sheets under tip 13. Stated otherwise, the two sheet-like membranes brought together in close substantially parallel relationship are conveyed in a direction parallel to their length substantially perpendicular to the direction of elongation of tip 13.

Causing ultrasonic welding device 10 to vibrate horn 12 at ultrasonic frequencies during the conveying of the two sheet-like membranes of ionically permeable thermoplastic separator material between tip 13 and the plurality of spaced apart anvil member welding surface areas 21 will provide high frequency mechanical impulses welding together regions of contact of the two membranes between tip 13 and anvil welding surface areas 21 as will be apparent to one skilled in the art. It will be further apparent to one skilled in the art that the ultrasonic welding will provide continuous spaced apart ultrasonically welding seams joining the two sheet-like membranes wherein the seams are substantially parallel to the direction of conveying (Arrow B of FIG. 1). The seams would be spaced apart substantially coincident with the spacing of the plurality of welding surface areas 21 of the plurality of spaced apart anvil members 20.

Although not required for the practice of the present invention, it would be advantageous to provide for forced air flow over the region where the ultrasonic welding is taking place, i.e., across tip 13 to remove heat generated by the ultrasonic sealing process from the anvils and ultrasonic welding tip. Air at room temperature is satisfactory. Means for providing the forced air flow are not illustrated since they may be readily provided by one skilled in the art.

Means are provided to cut each of the ultrasonically formed seams in a direction parallel to the length of the seams, i.e., parallel to the direction of conveyance of the sheet-like membranes through the ultrasonic welding station, with the cutting taking place such that the two sheet-like membranes remain joined adjacent each side of the cut. Preferrably, the seams would be cut about at the approximate center of the width of each seam. After cutting of the seams, means would be routinely provided to separate and take up the manufacture separator tubes.

In a preferred embodiment of the present invention, the cutting of the ultrasonically formed seams occurs substantially simultaneously with the formation of the seams.

The substantially simultaneous formation and cutting of the ultrasonically formed seams may be accomplished, in accordance with the present invention, by adjusting positive stop member 38 so that anvil members 20 rounded welding surface area 21 is positioned very close to but not touching the surface of tip 13 of ultrasonic welder 10 when the ultrasonic welder is not vibrating and advantageously such that there is no contact when ultrasonic tip 13 is vibrating. It will be appreciated that the vertical displacement of ultrasonic welding tip 13 (Arrow A of FIG. 1) during ultrasonic vibration is very small. When the tip 13 is ultrasonically vibrating and the two thin sheets of thermoplastic material are being conveyed through the ultrasonic welding station, the thermoplastic material passing through the interface between tip 13 and anvil welding surface area 21 is being substantially simultaneously ultrasonically welded and squeezed so that the material "balls up" on either side of the high point of the rounded anvil welding surface area 21 as illustrated in the greatly exaggerated view of FIG. 8. The "balling up" of the squeezed thermoplastic material roughly conforms to the rounded welding surface 21 of the anvil 20. Hence a substantially simultaneous welding and cutting of the two thin sheets of thermoplastic material is taking place with the sheets being joined adjacent each side of the cut.

If positive stop member 38 is adjusted so that anvil members 20 rounded welding surface area 21 is touching tip 13 of ultrasonic welder 10 when the ultrasonic welder is not vibrating, the invention will be operable but the welding surface 21 of the anvil 20 will tend to be damaged by the ultrasonic welding vibrations. Tip 13 is fabricated of carbide so that the anvil welding surface area 21 will sustain the damage in such a situation.

It will be appreciated that the geometry of anvil surface 21 will provide a seam joining the two sheet-like membrane separators having substantially equal widths and seam quality adjacent each side of the cut. It will be apparent that the substantially simultaneous formation and cutting of the ultrasonically welded seams provided by an anvil member such as illustrated in FIG. 4 is advantageous in that alignment of cutting means downstream of the ultrasonic welding is avoided.

Accordingly, the present invention provides an efficient apparatus and method for the manufacture of a plurality of tubular separator membranes by the ultrasonic welding of two sheets of thermoplastic separator material.

The present invention may also be practiced by positioning rounded welding surface areas 21 of anvil member 20 closely adjacent to but not very closely adjacent to tip 13. In operation, this will provide for the ultrasonic welding of the two thin sheets of thermoplastic material conveyed through the welding station but will not provide for the substantially simultaneous cutting of the ultrasonically welded seams. Cutting means may then be positioned downstream of ultrasonic welder 10 (in the direction of arrow B of FIG. 1) for cutting the ultrasonically formed seams so that the two thin sheets of thermoplastic material remain joined adjacent each side of the cut. If substantially simultaneous welding and cutting of seams is not desired, it is not required that welding surface area 21 of anvil member 20 be symmetrically, convexly, rounded transverse to the direction of conveyance of the two thin sheets of thermoplastic material.

In operation, a satisfactory positioning of welding surface areas 21 of anvil members 20 may be routinely determined by adjustment of positive stop member 38.

The thin sheet-like membrane separator material rolls 50 and 51 would be conveniently disposed on drums 40 and 41 respectively in a manner such that when the two sheets of membrane material 55 and 56 are conveyed and brought together in close substantially parallel relationship, their widths are substantially coterminous.

FIG. 5 is an enlarged schematic cross-sectional elevation view of a tubular separator 100, partially flattened, manufactured from two sheets of thermoplastic battery separator membrane material in accordance with the method and apparatus of the present invention. Separator 100 has two seams 101 and 102 having a width $W_1$. The minimum seam or seal width adjacent each side of the cut when substantially simultaneous welding and cutting is taking place, in accordance with the preferred embodiment of the present invention, is controlled by the compressed thickness of the sheets of thermoplastic material being joined. In general, the minimum seal width is about twice the compressed thickness of the sheets of thermoplastic materials being joined. Factors affecting the seam width will hereinafter be discussed.

FIG. 6 is an enlarged schematic cross-sectional elevation view of a tubular separator 105 having a tubular shape for receiving, for example, a cylindrical electrode, manufactured from two sheets of thermoplastic separator membrane material in accordance with the method and apparatus of the present invention. Separator 105 has two seams 106 and 107, having a width $W_2$, and a diameter D when in tubular form. Tubular electrode separators may typically have a diameter of, for example, about 0.25 to 4.0 inches. The spacing between the plurality of anvil members 20 positioned below tip 13 of ultrasonic welder 10 and hence the spacing of anvil welding surface areas 21 would be selected to form the spaced continuous ultrasonic seams for cutting at a distance so as to provide tubular separators with the desired finished inside diameter D.

In the embodiment of the present invention illustrated in FIG. 3, the spacing of the anvil members 20 with respect to the direction of elongation of tip 13 and hence the spacing of the ultrasonically formed seams joining the two sheet-like membranes would be determined by the lateral spacing between arm members 31. To adjust the spacing, arm members 31 may be moved laterally on rod 60 after loosening set screw 33b in bushing 33a.

The faster the speed of conveyance of the thin sheet-like thermoplastic material through the welding station, the narrower will be the width of the ultrasonically welded seam because less ultrasonic energy will be available per unit of time. Accordingly, for a given speed of conveyance, the greater the ultrasonic energy output the wider will be the resulting seam. The greater the speed of conveyance of the sheets of thermoplastic material, the greater should be the compression of spring 37 by the adjustment of tension adjust nut 36. Good quality seams at increased conveyance speeds may be obtained by the hereinbefore discussed cooling of the thermoplastic sheets prior to their passing through the welding station and by providing the hereinbefore discussed forced air cooling across the welding tip 13 and anvil members 20. A satisfactory spring 37 compression for good quality seams would be routinely determined by adjusting tension adjust nut 36. As hereinbefore discussed, positive stop member 38 is also routinely adjusted to get good quality seams, clean cuts and minimum wear of welding surfaces 21 of anvil members 20.

A satisfactory radius $R_1$ (FIG. 4) defining the convexly rounded welding surface area 21 of anvil member 20 would be approximately equal to about the total compressed thickness of the material being ultrasonically joined.

Typical speeds of conveyance of the thin sheet-like membrane material are, for example, about 20 to 30 feet/minute.

The ultrasonic welding vibration frequency used in the practice of the present invention may be, for example, about 10 KHz to 40 KHz. An ultrasonic vibration frequency of about 20 KHz has been found to be particularly suitable. An ultrasonic energy of about 500 to 1000 acoustical watts has been found satisfactory.

It is apparent that at least two anvil members 20 would be required to manufacture one tubular separator from two sheets of thermoplastic material in accordance with the method and apparatus of the present invention. However, the present invention is most advantageously practiced using a plurality of anvil members so as to manufacture a plurality of tubular separators simultaneously from two sheet-like membranes of thermoplastic separator material. The number of tubular separators simultaneously manufactured would be one less than the number of spaced apart anvil member welding surface areas provided.

An advantageous arrangement for providing a plurality of spaced apart anvil members 20 disposed below and closely adjacent tip 13 of ultrasonic welder 10 is illustrated schematically in plan in FIG. 7. All the anvil members 20 are mounted on arms 31 substantially as illustrated in FIGS. 1 and 3 and described in conjunction therewith. However, the arms 31 mounting the anvil members 20 alternatively extend to the right and left (as viewed in FIG. 7) for adjacent anvil members.

The structural arrangements described herein are disclosures of preferred embodiments. Many variations could be made by one skilled in the art. For example, the anvil members 20 could have a variety of shapes and mounting arrangements. The anvil members could be resiliently or non-resiliently mounted. The anvil welding surface areas could be flat, rounded transverse to the direction of sheet-like membrane conveyance or rounded in the direction of the sheet-like membrane conveyance. The anvil could be a single structural member having a plurality of spaced apart welding surfaces thereon. As hereinbefore discussed, for the preferred substantially simultaneous welding and cutting, the anvil welding surface area must be rounded transverse to the direction of conveyance of the sheet-like thermoplastic material.

The thermoplastic material contemplated herein for use with the present invention includes lightly crosslinked thermoplastic. Heavily crosslinked thermoplastics (e.g., about 90 Mrad) are not considered practical for use in the invention. Separators cannot be practically manufactured in accordance with the present invention using heavily crosslinked thermoplastic membrane material because the ultrasonic welding of the seams will not be successful. If desired, the thermoplastic tubular separators manufactured in accordance with the method and apparatus of the present invention may be heavily crosslinked after their manufacture.

Suitable thermoplastic materials for use as separator membranes in accordance with the present invention are, for example, ionically permeable films of polyethylene, polypropylene, copolymers of ethylenepropylene, copolymers of ethyleneacrylate, copolymers of ethylenemethacrylate, copolymers of ethyleneacetates, and copolymers of tetrafluoroethylenehexafluoropropylene. Such films are most suitably made ionically permeable by well known chemical or radiation grafting techniques which are well known in the art. Typical radiation grafting techniques are described in U.S. Pat. Nos. 4,230,549 and 3,427,206. Ionically permeable microporous membranes may be used. Mixtures of thermoplastic films and grafts thereof may also be used.

The most suitable membrane materials for use with the present invention are radiation grafted polyethylene and polypropylene.

Sheets of thin thermoplastic material having a thickness of, for example, about $0.5 \times 10^{-3}$ to $30 \times 10^{-3}$ inch and suitably abut $1 \times 10^{-3}$ to $10 \times 10^{-3}$ inch may be used in the present invention.

The method and apparatus in accordance with the present invention is also readily adaptable for use with thin thermoplastic separator membrane material having contiguously associated on one or both sides thereof mats of thermoplastic electrolyte absorbent material. Such composite separator/absorbent membranes for use as battery separators are well known in the art. The electrolyte absorbent material is frequently referred to in the art as felt and typically comprise thin woven or non-woven mats of fibrous thermoplastic material such as polyethylene, polypropylene and heat sealable composites of sealable thermoplastic fibers and non-sealable fibers. A preferred absorbent felt for use with the separator membrane in the method and apparatus in accordance with the present invention is non-woven polypropylene.

The thin felt absorbent material is typically joined in contiguous association with the thin ionically permeable membrane to form the composite separator/absorber by point heat bonding, adhesive bonding or non-bonded contiguous association.

Thin sheets of the composite ionically permeable membrane and absorbent felt composite separator material are disposed in rolls 50 and 51 on drums 40 and 41 and the present invention is practiced as hereinbefore described. Most typically, the felt material will be contiguously associated on only one side of ionically permeable separator material and it is positioned on that side of the composite sheets such that when the two composite sheets are dispensed from rolls 50 and 51 and brought together in close parallel relationship the felt sides will be adjacent. Therefore, when a tubular battery separator is formed, the felt will be on the internal side of the tubular separator so as to be adjacent the generally cylindrical shaped electrode typically the anode, and the ionically permeable membrane will be the external portion of the tubular separator. It will be apparent that if the absorbent felt is not prebonded to its associated ionically permeable membrane, four or more drums for dispensing material may be used.

The present invention may be used with thin sheets of composite ionically permeable membrane and felt absorbent separators wherein the ionically permeable membrane has typically a thickness of, for example, about $0.5 \times 10^{-3}$ to $30 \times 10^{-3}$ inches and suitably about $1 \times 10^{-3}$ to $10 \times 10^{-3}$ inches and wherein the thickness of the absorbent felt mat material may typically be about $1 \times 10^{-3}$ to $20 \times 10^{-3}$ inches and suitably about $3 \times 10^{-3}$ to $10 \times 10^{-3}$ inches.

The seams formed by the hereinbefore described ultrasonic welding will penetrate the two brought together composite thin sheets passing between the welding tip 13 of welder 10 and the anvil 20 welding surface area to form the seal for fabricating the tubular separator.

If desired, the thin ionically permeable membrane material and the thin felt absorbent material may each comprise more than one layer of material.

The following examples are set forth for illustrative purposes to further assist in the understanding of the present invention.

EXAMPLE I

Tubular battery separators were manufactured using the method and apparatus in accordance with the present invention from a thin ionically permeable thermoplastic membrane material without felt absorbent. The membrane material was methacrylic acid grafted polypropylene having a thickness of about $1 \times 10^{-3}$ inch (mils). This membrane material is sold as Permion E-6001 manufactured by RAI Research Corporation, Hauppauge, Long Island, N.Y. Rolls of this material, having a width of about $2\frac{1}{2}$ inches, were disposed on drums 40 and 41 and conveyed through the hereinbefore described apparatus at a speed of about 30 feet/minute.

The length of tip 13 of ultrasonic welder 10 in the direction of elongation was about 3 inches. Six disc-shaped anvil members 20 were disposed below and closely adjacent tip 13 with the spacing between the center of each of the discs being about 0.356 inches. The convex welding surface area 21 was defined by about a 0.006 inch radius $R_1$. Positive stop member 38 was adjusted so that the gap between the topmost point of anvil welding surface 21 and the surface of tip 13 was about 0.001 inches when tip 13 was not vibrating. Spring 37 was compressed by tension adjusted nut 36 so that the sheet-like membrane material would be substantially simultaneously ultrasonically sealed and cut.

The membrane separator material was cooled to a temperature of about 10° C. prior to being fed through the welding station. Air, having a temperature of about 25° C., was blown or forced across the welding tip at a rate of about 50 cu. ft/min.

The tip 13 was ultrasonically vibrated at a frequency of about 20 KHz by ultrasonic welder 10 with an ultrasonic energy of about 1000 acoustic watts.

Accordingly, five tubular battery separators (one less than the number of anvil members) were continuously fabricated in accordance with the method and apparatus of the present invention by substantial simultaneous welding and cutting seams through the two sheets of battery separator membrane material. The width of each seam adjacent each cut was about $5 \times 10^{-3}$ inches (mils). The tubular separators so manufactured had a nominal diameter of about 0.33 inches.

EXAMPLE II

Tubular battery separators were manufactured using the method and apparatus in accordance with the present invention from a composite battery separator material. The composite separator material comprised a thin ionically permeable thermoplastic membrane with a thin felt absorbent material contiguously associated on one side thereof. The ionically permeable thermoplastic membrane material was methacrylic acid grafted polypropylene having a thickness of about $1 \times 10^{-3}$ inches (mils). This ionically permeable membrane material is sold as Permion E-6001 manufactured by RAI Research Corporation, Hauppauge, Long Island, N.Y.

The felt absorbent material was fibrous non-woven polypropylene mat having a thickness of about $12 \times 10^{-3}$ inches (mils). The felt absorbent material is sold as SP-126 manufactured by Kendall Mill, Waltham, Mass.

The felt absorbent material was joined in contiguous association with one side of the ionically permeable membrane material by adhesive bonding.

The thickness of the composite material was about $12-13 \times 10^{-3}$ inches (mils).

Rolls of this material, having a width of about $2\frac{1}{2}$ inches, were disposed on drums 40 and 41 and conveyed through the hereinbefore described apparatus at a speed of about 30 feet/minute. The composite material was disposed on the drums such that the felt absorbent material was adjacent when the two sheets of material dispensed from drums were brought together. Therefore, when the tubular separators are formed, the felt absorbent material will be on the interior of the tubes.

The length of tip 13 of ultrasonic welder 10 in the direction of elongation was about 3 inches. Six disc-shaped anvil members 20 were disposed below and closely adjacent tip 13 with the spacing between the center of each of the discs being about 0.356 inches. The convex welding surface area 21 was defined by about a 0.006 inch radius $R_1$. Positive stop 38 was adjusted so that the gap between the topmost point of anvil welding surface 21 and tip 13 was about 0.001 inches when tip 13 was not vibrating. Spring 37 was compressed by tension adjust nut 36 so that the sheet-like membrane material would be substantially simultaneously ultrasonically sealed and cut.

The composite separator material was cooled to a temperature of about 10° C. prior to being fed through the welding station. Air, having a temperature of about 25° C., was blown or forced across the welding tip at a rate of about 50 cu. ft/minute.

The tip 13 was ultrasonically vibrated at a frequency of about 20 KHz by ultrasonic welder 10 with an ultrasonic energy of about 1000 acoustic watts.

Accordingly, five tubular battery separators (one less than the number of anvil members) were continuously fabricated in accordance with the method and apparatus of the present invention by substantially simultaneous welding and cutting seams through the two sheets of composite battery separator material. The width of each seam adjacent each cut was about $10 \times 10^{-3}$ inches (mils). The tubular separators so manufactured from the composite battery separator material had a nominal diameter of about 0.33 inches.

In addition to increasing the speed and efficiency at which tubular separators may be manufactured in comparison with the hereinbefore described prior art methods, the apparatus and method of the present invention results in less material waste. The lap or tab of material which the prior art requires to heat seal or glue the seam of a sheet of separator material which is rolled into tubular form is not required in the present invention. The ultrasonically formed seams of the present invention are very narrow.

Moreover, tubular separators manufactured by the present invention have a greater effective area than those of the prior art. This is because the ultrasonically formed seals of the present invention are very narrow and the overlap of the lap seal or the required folding back of the tab seal of the prior art are eliminated.

Furthermore, tubular separators manufactured in accordance with the present invention have a greater effective ionically permeable area because there is only a very small transition zone adjacent the seal wherein heat has increased the electrolytic resistance as compared to prior art heat sealing and impulse heat sealing. In heat sealing methods, heat is being inputted into the membrane material to cause material melting to form the seal. Thus, in these prior art methods, at areas adjacent the seal, the melting process has begun which causes a high electrolytic resistance in these areas. In the present invention, the seal is formed by frictional heat caused by mechanical ultrasonic vibrations at the interfaces of the sealed area. The area adjacent the seal tends to remain cool. The present invention results in a very small transition area in comparison to prior art heat sealing and impulse heat sealing. It should be noted, that in the present invention, the ultrasonic welding tool and the anvils are not inputting heat into the membrane material. The sealing heat is provided by friction. In the present invention, the ultrasonic welding tip and anvils may, if desired, be kept cool by the hereinbefore described forced air flow.

The method and apparatus of the present invention also provides good effective sealing of sheets of composite membrane/absorbent felt separator materials when the absorbent sheet material thickness is substantially greater than the membrane sheet thickness in comparison to prior art heat sealing and impulse heat sealing methods. This is again believed due to the sealing being performed by frictional heat generated at the interfaces of the sealed areas whereas the prior art is transferring external heat through different materials of different thicknesses.

It will also be apparent that the tubular separators manufactured in accordance with the method and apparatus of the present invention may be cut into desired lengths, after their manufacture, by any convenient means.

Although preferred embodiments of the method and apparatus in accordance with the present invention have been described in detail, it is contemplated that modifications may be made within the spirit and scope of the invention. The arrangement and structure of the components of the present invention may be made in a variety of configurations that will be apparent to those skilled in the art. The present invention may be adapted for use in many applications requiring the joining of thin sheets of thermoplastic materials.

What is claimed is:

1. A method for manufacturing thermoplastic tubular separators comprising:
   bringing together two thin ionically permeable sheet-like membranes of thermoplastic material in close substantially parallel relationship;
   conveying said membranes in a predetermined path;
   continuously ultrasonically welding said membranes at least at two locations spaced apart in a direction substantially perpendicular to the direction of said conveying at a selected position along said path thereby forming at least two continuous spaced apart seams substantially parallel to the direction of said conveying joining said membranes.

2. A method as recited in claim 1 wherein said membranes are ultrasonically welded at a plurality of said spaced apart locations thereby providing a plurality of said spaced apart seams.

3. A method as recited in claim 2 wherein the spacing between each of said locations and thereby between each of said seams is substantially equal.

4. A method as recited in claim 3 wherein the spacing between each of said seams is substantially greater than the width of said seams.

5. A method as recited in claims 1, 2, 3 or 4 further comprising cooling said membranes to at least about 10° C. at a selected position along said path prior to said ultrasonic welding.

6. A method as recited in claim 1, 2, 3 or 4 wherein said thermoplastic material of said ionically permeable sheet-like membrane is selected from the group consisting of polyethylene, polypropylene, copolymers of ethylene with propylene, copolymers of ethylene with acrylate esters, copolymers of ethylene with methacrylate esters, copolymers of ethylene with olefin acetates and copolymers of tetrafluoroethylene and hexafluoropropylene.

7. A method as recited in claims 1, 2, 3 or 4 wherein said thin sheet-like ionically permeable membrane has a thickness of about $0.5 \times 10^{-3}$ inch to $30 \times 10^{-3}$ inch.

8. A method as recited in claims 1, 2, 3 or 4 wherein said thin sheet-like ionically permeable membrane comprises more than one layer of thermoplastic material.

9. A method as recited in claims 1, 2, 3 or 4 further comprising cutting said seams substantially parallel to the direction of said conveying such that said membranes remain joined adjacent each side of said cut.

10. A method as recited in claim 9 wherein said ultrasonic welding and said cutting occur substantially simultaneously.

11. A method as recited in claim 10 wherein;
said membranes have a length that substantially exceeds the width;
said membranes are brought together with their widths essentially coterminous; and
the direction of said conveying is along the length of said membranes.

12. A method as recited in claim 10 further comprising cooling said membranes to at least about 10° C. prior to said ultrasonic welding.

13. A method as recited in claims 1, 2, 3 or 4 wherein;
each of said ionically permeable membranes has contiguously associated and essentially coextensive therewith on at least one side thereof a thin sheet-like electrolyte absorbent felt material comprising a fibrous thermoplastic; and
said seams formed by said ultrasonic welding thereby continuously join said ionically permeable membranes and said absorbent felt materials.

14. A method as recited in claim 13 wherein said one side of each of said ionically permeable membranes is selected so that when said membranes are brought together said absorbent felt materials are adjacent.

15. A method as recited in claim 13 further comprising cutting each seam parallel to the direction of said conveying such that said contiguously associated ionically permeable membranes and said absorbent felt materials remain joined adjacent each side of said cut.

16. A method as recited in claim 15 wherein said ultrasonic welding and said cutting occur substantially simultaneously.

17. A method as recited in claim 16 further comprising cooling said contiguously associated ionically permeable membranes and absorbent felt materials to at least about 10° C. prior to said ultrasonic welding.

18. A method as recited in claim 17 wherein;
each of said contiguously associated ionically permeable membranes and absorbent felt materials have a length that substantially exceeds the width;
said contiguously associated ionically permeable membranes and absorbent felt materials are brought together with their widths essentially coterminous; and
the direction of said conveying is along the length of said contiguously associated membranes and absorbent felt materials.

19. A method as recited in claim 13 wherein said absorbent felt material is contiguously associated and essentially coterminous with both sides of each of said ionically permeable membranes.

20. A method as recited in claim 13 wherein said thin sheet-like ionically permeable membrane has a thickness of about $0.5 \times 10^{-3}$ inch to $30 \times 10^{-3}$ inch.

21. A method as recited in claim 13 wherein said thin sheet-like electrolyte absorbent felt material has a thickness of about $1 \times 10^{-3}$ inch to $20 \times 10^{-3}$ inch.

22. A method as recited in claim 13 wherein said thin sheet-like ionically permeable membrane comprises more than one layer of thermoplastic material.

23. A method as recited in claim 13 wherein said thin sheet-like electrolyte absorbent felt material comprises more than one layer of mats of fibrous thermoplastic.

24. A method as recited in claim 1 wherein each of said membranes comprises two sheets of ionically permeable thermoplastic material having a sheet of fibrous thermoplastic electrolyte absorbent thermoplastic material disposed therebetween.

25. A method for joining thermoplastic material comprising:
bringing together two thin ionically permeable sheet-like membranes of thermoplastic material in close substantially parallel relationship;
conveying said sheets in a predetermined path;
continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets;
cooling said sheets to at least about 10° C. prior to said ultrasonic welding.

26. A method for manufacturing thermoplastic tubular shaped members comprising:
bringing together two thin sheets of thermoplastic material in close substantially parallel relationship;
conveying said sheets in a predetermined path;
continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets; and
cutting said seams substantially parallel to the direction of said conveying substantially simultaneously ionically permeable thermoplastic membrane with a thin felt absorbent material contiguously associated on one side thereof. The ionically permeable thermoplastic membrane material was methacrylic acid grafted polypropylene having a thickness of about $1 \times 10^{-3}$ inches (mils). This ionically permeable membrane material is sold as Permion E-6001 manufactured by RAI Research Corporation, Hauppauge, Long Island, N.Y.

The felt absorbent material was fibrous non-woven polypropylene mat having a thickness of about $12 \times 10^{-3}$ inches (mils). The felt absorbent material is sold as SP-126 manufactured by Kendall Mill, Waltham, Mass.

The felt absorbent material was joined in contiguous association with one side of the ionically permeable membrane material by adhesive bonding.

The thickness of the composite material was about $12-13 \times 10^{-3}$ inches (mils).

Rolls of this material, having a width of about $2\frac{1}{2}$ inches, were disposed on drums 40 and 41 and conveyed through the hereinbefore described apparatus at a speed of about 30 feet/minute. The composite material was disposed on the drums such that the felt absorbent material was adjacent when the two sheets of material dispensed from drums were brought together. Therefore, when the tubular separators are formed, the felt absorbent material will be on the interior of the tubes.

The length of tip 13 of ultrasonic welder 10 in the direction of elongation was about 3 inches. Six disc-shaped anvil members 20 were disposed below and closely adjacent tip 13 with the spacing between the center of each of the discs being about 0.356 inches. The convex welding surface area 21 was defined by about a 0.006 inch radius $R_1$. Positive stop 38 was adjusted so that the gap between the topmost point of anvil welding surface 21 and tip 13 was about 0.001 inches when tip 13 was not vibrating. Spring 37 was compressed by tension adjust nut 36 so that the sheet-like membrane material would be substantially simultaneously ultrasonically sealed and cut.

The composite separator material was cooled to a temperature of about 10° C. prior to being fed through the welding station. Air, having a temperature of about 25° C., was blown or forced across the welding tip at a rate of about 50 cu. ft/minute.

The tip 13 was ultrasonically vibrated at a frequency of about 20 KHz by ultrasonic welder 10 with an ultrasonic energy of about 1000 acoustic watts.

Accordingly, five tubular battery separators (one less than the number of anvil members) were continuously fabricated in accordance with the method and apparatus of the present invention by substantially simultaneous welding and cutting seams through the two sheets of composite battery separator material. The width of each seam adjacent each cut was about $10 \times 10^{-3}$ inches (mils). The tubular separators so manufactured from the composite battery separator material had a nominal diameter of about 0.33 inches.

In addition to increasing the speed and efficiency at which tubular separators may be manufactured in comparison with the hereinbefore described prior art methods, the apparatus and method of the present invention results in less material waste. The lap or tab of material which the prior art requires to heat seal or glue the seam of a sheet of separator material which is rolled into tubular form is not required in the present invention. The ultrasonically formed seams of the present invention are very narrow.

Moreover, tubular separators manufactured by the present invention have a greater effective area than those of the prior art. This is because the ultrasonically formed seals of the present invention are very narrow and the overlap of the lap seal or the required folding back of the tab seal of the prior art are eliminated.

Furthermore, tubular separators manufactured in accordance with the present invention have a greater effective ionically permeable area because there is only a very small transition zone adjacent the seal wherein heat has increased the electrolytic resistance as compared to prior art heat sealing and impulse heat sealing. In heat sealing methods, heat is being inputted into the membrane material to cause material melting to form the seal. Thus, in these prior art methods, at areas adjacent the seal, the melting process has begun which causes a high electrolytic resistance in these areas. In the present invention, the seal is formed by frictional heat caused by mechanical ultrasonic vibrations at the interfaces of the sealed area. The area adjacent the seal tends to remain cool. The present invention results in a very small transition area in comparison to prior art heat sealing and impulse heat sealing. It should be noted, that in the present invention, the ultrasonic welding tool and the anvils are not inputting heat into the membrane material. The sealing heat is provided by friction. In the present invention, the ultrasonic welding tip and anvils may, if desired, be kept cool by the hereinbefore described forced air flow.

The method and apparatus of the present invention also provides good effective sealing of sheets of composite membrane/absorbent felt separator materials when the absorbent sheet material thickness is substantially greater than the membrane sheet thickness in comparison to prior art heat sealing and impulse heat sealing methods. This is again believed due to the sealing being performed by frictional heat generated at the interfaces of the sealed areas whereas the prior art is transferring external heat through different materials of different thicknesses.

It will also be apparent that the tubular separators manufactured in accordance with the method and apparatus of the present invention may be cut into desired lengths, after their manufacture, by any convenient means.

Although preferred embodiments of the method and apparatus in accordance with the present invention have been described in detail, it is contemplated that modifications may be made within the spirit and scope of the invention. The arrangement and structure of the components of the present invention may be made in a variety of configurations that will be apparent to those skilled in the art. The present invention may be adapted for use in many applications requiring the joining of thin sheets of thermoplastic materials.

What is claimed is:

1. A method for manufacturing thermoplastic tubular separators comprising:
    bringing together two thin ionically permeable sheet-like membranes of thermoplastic material in close substantially parallel relationship;
    conveying said membranes in a predetermined path;
    continuously ultrasonically welding said membranes at least at two locations spaced apart in a direction substantially perpendicular to the direction of said conveying at a selected position along said path thereby forming at least two continuous spaced apart seams substantially parallel to the direction of said conveying joining said membranes.

2. A method as recited in claim 1 wherein said membranes are ultrasonically welded at a plurality of said spaced apart locations thereby providing a plurality of said spaced apart seams.

3. A method as recited in claim 2 wherein the spacing between each of said locations and thereby between each of said seams is substantially equal.

4. A method as recited in claim 3 wherein the spacing between each of said seams is substantially greater than the width of said seams.

5. A method as recited in claims 1, 2, 3 or 4 further comprising cooling said membranes to at least about 10° C. at a selected position along said path prior to said ultrasonic welding.

6. A method as recited in claim 1, 2, 3 or 4 wherein said thermoplastic material of said ionically permeable sheet-like membrane is selected from the group consisting of polyethylene, polypropylene, copolymers of ethylene with propylene, copolymers of ethylene with acrylate esters, copolymers of ethylene with methacrylate esters, copolymers of ethylene with olefin acetates and copolymers of tetrafluoroethylene and hexafluoropropylene.

7. A method as recited in claims 1, 2, 3 or 4 wherein said thin sheet-like ionically permeable membrane has a thickness of about $0.5 \times 10^{-3}$ inch to $30 \times 10^{-3}$ inch.

8. A method as recited in claims 1, 2, 3 or 4 wherein said thin sheet-like ionically permeable membrane comprises more than one layer of thermoplastic material.

9. A method as recited in claims 1, 2, 3 or 4 further comprising cutting said seams substantially parallel to the direction of said conveying such that said membranes remain joined adjacent each side of said cut.

10. A method as recited in claim 9 wherein said ultrasonic welding and said cutting occur substantially simultaneously.

11. A method as recited in claim 10 wherein;
said membranes have a length that substantially exceeds the width;
said membranes are brought together with their widths essentially coterminous; and
the direction of said conveying is along the length of said membranes.

12. A method as recited in claim 10 further comprising cooling said membranes to at least about 10° C. prior to said ultrasonic welding.

13. A method as recited in claims 1, 2, 3 or 4 wherein;
each of said ionically permeable membranes has contiguously associated and essentially coextensive therewith on at least one side thereof a thin sheet-like electrolyte absorbent felt material comprising a fibrous thermoplastic; and
said seams formed by said ultrasonic welding thereby continuously join said ionically permeable membranes and said absorbent felt materials.

14. A method as recited in claim 13 wherein said one side of each of said ionically permeable membranes is selected so that when said membranes are brought together said absorbent felt materials are adjacent.

15. A method as recited in claim 13 further comprising cutting each seam parallel to the direction of said conveying such that said contiguously associated ionically permeable membranes and said absorbent felt materials remain joined adjacent each side of said cut.

16. A method as recited in claim 15 wherein said ultrasonic welding and said cutting occur substantially simultaneously.

17. A method as recited in claim 16 further comprising cooling said contiguously associated ionically permeable membranes and absorbent felt materials to at least about 10° C. prior to said ultrasonic welding.

18. A method as recited in claim 17 wherein;
each of said contiguously associated ionically permeable membranes and absorbent felt materials have a length that substantially exceeds the width;
said contiguously associated ionically permeable membranes and absorbent felt materials are brought together with their widths essentially coterminous; and
the direction of said conveying is along the length of said contiguously associated membranes and absorbent felt materials.

19. A method as recited in claim 13 wherein said absorbent felt material is contiguously associated and essentially coterminous with both sides of each of said ionically permeable membranes.

20. A method as recited in claim 13 wherein said thin sheet-like ionically permeable membrane has a thickness of about $0.5 \times 10^{-3}$ inch to $30 \times 10^{-3}$ inch.

21. A method as recited in claim 13 wherein said thin sheet-like electrolyte absorbent felt material has a thickness of about $1 \times 10^{-3}$ inch to $20 \times 10^{-3}$ inch.

22. A method as recited in claim 13 wherein said thin sheet-like ionically permeable membrane comprises more than one layer of thermoplastic material.

23. A method as recited in claim 13 wherein said thin sheet-like electrolyte absorbent felt material comprises more than one layer of mats of fibrous thermoplastic.

24. A method as recited in claim 1 wherein each of said membranes comprises two sheets of ionically permeable thermoplastic material having a sheet of fibrous thermoplastic electrolyte absorbent thermoplastic material disposed therebetween.

25. A method for joining thermoplastic material comprising:
bringing together two thin ionically permeable sheet-like membranes of thermoplastic material in close substantially parallel relationship;
conveying said sheets in a predetermined path;
continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets;
cooling said sheets to at least about 10° C. prior to said ultrasonic welding.

26. A method for manufacturing thermoplastic tubular shaped members comprising:
bringing together two thin sheets of thermoplastic material in close substantially parallel relationship;
conveying said sheets in a predetermined path;
continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets; and
cutting said seams substantially parallel to the direction of said conveying substantially simultaneously with the formation thereof such that said sheets remain joined adjacent each side of said cut.

27. A method for manufacturing thermoplastic tubular shaped members comprising:
bringing together two thin sheets of thermoplastic material in close substantially parallel relationship;
conveying said sheets in a predetermined path;
continuously ultrasonically welding said sheets at least at two locations spaced apart in a direction substantially perpendicular to the direction of said conveying at a selected position along said path thereby forming at least two continuous spaced apart seams substantially parallel to the direction of said conveying joining said sheets;
cutting said seams substantially parallel to the direction of said conveying substantially simultaneously with the formation thereof such that said sheets remain joined adjacent each side of said cut;
cooling said sheets to at least about 10° C. prior to said ultrasonic welding.

28. A method as recited is claims 25, 26 or 27 wherein each of said sheets comprises more than one layer of thermoplastic material.

29. A method as recited in claims 26 or 27 wherein said thermoplastic material is ionically permeable.

30. A method as recited in claim 25 or 27 wherein said sheets are cooled to from about 10° C. to −30° C.

31. A method as recited in claims 25, 26 or 27 wherein said sheets are ultrasonically welded at a plurality of said spaced apart locations thereby providing a plurality of said spaced apart seams.

32. A method for manufacturing thermoplastic tubular members comprising:
providing an ultrasonic welding device having a horn with an elongated tip;
providing at least two surface areas on a resiliently mounted anvil member wherein said surface areas are closely adjacent said tip for applying pressure substantially perpendicular to said tip on a workpiece passed between said tip and said surface areas with said anvil surface areas being spaced apart in the direction of said tip elongation;
bringing together two thin sheet-like ionically permeable membranes of thermoplastic material in close substantially parallel relationship;
conveying said sheet-like membranes between said tip and said anvil member surface areas wherein the direction of said conveying is substantially perpendicular to the direction of said elongation of said tip;
cooling said thermoplastic sheets to at least about 10° C. prior to their conveyance between said tip and said anvil member surface areas;
causing said ultrasonic device to vibrate said horn at ultrasonic frequencies during said conveying to produce high frequency mechanical impulses to ultrasonically weld together regions of contact of said membranes between said tip and said anvil surface areas whereby continuous seams substantially parallel to the direction of said conveying are formed joining said conveyed membranes; and
cutting said seams substantially parallel to the direction of said conveying such that said membranes remain joined adjacent each side of said cut.

33. A method as recited in claim 32 wherein there are a plurality of said spaced apart anvil surface areas thereby providing a plurality of said continuous seams.

34. A method as recited in claims 32 or 33 wherein each anvil surface area is located on an individual anvil member.

35. A method as recited in claims 32 or 33 wherein said cutting occurs substantially simultaneously with the formation of said seams.

36. A method as recited in claims 32 or 33 wherein;
each of said ionically permeable membranes has contiguously associated and essentially coextensive therewith on at least on side thereof a thin sheet-like electrolyte absorbent felt material comprising fibrous thermoplastic; and
said seams formed by said ultrasonic welding continuously join said ionically permeable membranes and said absorbent felt materials.

37. A method as recited in claim 36 wherein said cutting occurs substantially simultaneously with the formation of said seams.

* * * * *